United States Patent [19]

Douman

[11] Patent Number: 5,720,665
[45] Date of Patent: Feb. 24, 1998

[54] FLEXIBLE PLATE DEVICE WITH VIBRATION ABSORBING CAPABILITIES FOR USE WITH A FLYWHEEL MECHANISM

[75] Inventor: Yasunori Douman, Okayama-ken, Japan

[73] Assignee: Exedy Corporation, Osaka, Japan

[21] Appl. No.: 713,706

[22] Filed: Sep. 13, 1996

[30] Foreign Application Priority Data

Nov. 16, 1995 [JP] Japan .................. 7-298734

[51] Int. Cl.⁶ .................................................. F16D 3/78
[52] U.S. Cl. .................. 464/98; 192/70.17; 464/162
[58] Field of Search ................. 464/51, 98, 99, 464/100, 101, 162; 192/70.27, 70.17, 55.2, 55.3, 200

[56] References Cited

U.S. PATENT DOCUMENTS

| | | | |
|---|---|---|---|
| 2,142,178 | 1/1939 | Cole et al. | 192/55.2 X |
| 4,689,953 | 9/1987 | Wang | 464/100 X |
| 4,795,012 | 1/1989 | Durum | 192/55.3 X |
| 4,871,342 | 10/1989 | Boss et al. | 192/200 X |
| 5,062,517 | 11/1991 | Muchmore et al. | |
| 5,119,911 | 6/1992 | Bochot et al. | 192/200 X |
| 5,368,146 | 11/1994 | Kohno et al. | 464/98 X |
| 5,515,745 | 5/1996 | Tsuruta et al. | 192/200 X |
| 5,636,721 | 6/1997 | Weidinger | 192/70.27 |

*Primary Examiner*—Eileen A. Dunn
*Attorney, Agent, or Firm*—Shinjyu Office of Patent Attorneys

[57] ABSTRACT

A flexible plate assembly which transmits torque from a crankshaft in an engine to a flywheel while absorbing bending vibration, and includes a first flexible plate, a second flexible plate, and a friction plate. An inner portion of the first flexible plate is fixed to a distal end of the crankshaft, and an outer portion of the first flexible plate is connected to a flywheel. The friction plate is disposed between the first and second flexible plates. The friction plate and the second flexible plate are connected to a mid-portion of the first flexible plate between the crankshaft and the flywheel.

3 Claims, 3 Drawing Sheets

FLEXIBLE PLATE DEVICE WITH VIBRATION ABSORBING CAPABILITIES FOR USE WITH A FLYWHEEL MECHANISM

BACKGROUND OF THE INVENTION

A. Field of the invention

The present invention relates to a flexible plate for a flywheel assembly. More particularly, it relates to a flexible plate for dampening bending vibrations transmitted to a flywheel assembly.

B. Description of the related art

In a typical motor vehicle, a flywheel is attached to a distal end of an engine crankshaft, and a clutch disc assembly and clutch cover assembly are attached to the flywheel. The flywheel is provided with a friction surface which opposes the friction facing of the clutch disc assembly. When the friction facing is pressed against the friction surface of the flywheel, torque from the engine is transmitted to the clutch disc assembly and applied to the transmission of the vehicle.

A disc-shaped flexible plate has conventionally been used as an element to connect the distal end of the crankshaft with the flywheel. This type of flexible plate is typically rigid in radial directions and is capable of being elastically deformed in bending directions, where the bending directions are defined as the directions of elastic deformation of the flexible plate generally along line defined by the central axis of the crankshaft of the engine. Further, the bending directions are also defined as the directions about a point defined by the intersection of the central axis if the crankshaft of the engine and the center of the flexible plate. The flexible plate is used to absorb bending vibrations transmitted from the engine.

It is considered desirable to dampen as many of these bending vibrations as possible because they can be felt and heard by the passengers in the vehicle. However, the conventional flexible plate can only dampen some, but not all, of the bending vibrations transmitted from the engine. It has long been desirable to create a flexible plate which can more efficiently dampen these bending vibrations.

SUMMARY OF THE INVENTION

It is therefore an object of the present invention to provide a flexible plate in a flywheel assembly which can effectively dampen bending vibrations.

In one aspect of the present invention, a flexible plate device is configured for transferring torque from a crankshaft of an engine to a flywheel and absorbing bending vibration therebetween. The flexible plate device includes a first plate having an outer circumferential portion connect to a flywheel, and an inner portion connected to a flywheel. The flexible plate device also includes a second plate fixed to a mid-portion of the first plate between the outer circumferential portion and the inner portion of the first plate by a plurality of pins which extend through apertures in the first and second plates. Further, a friction plate is disposed between the first and second plates, the friction plate being configured to produce friction between itself and the first and second plates in response to elastic deformation of the first plate in the axial directions.

Preferably, inner circumferential portions of the flywheel are spaced apart from the inner portion of the first plate defining a predetermined gap in a torsion free state.

Other objects, features, aspects and advantages of the present invention will be apparent from the following detailed description of the present invention when taken in conjunction with the accompanying drawings, in which like reference numerals designate the same or similar parts throughout.

DETAILED DESCRIPTION OF THE PREFERRED EMBODIMENTS

Figure 1:
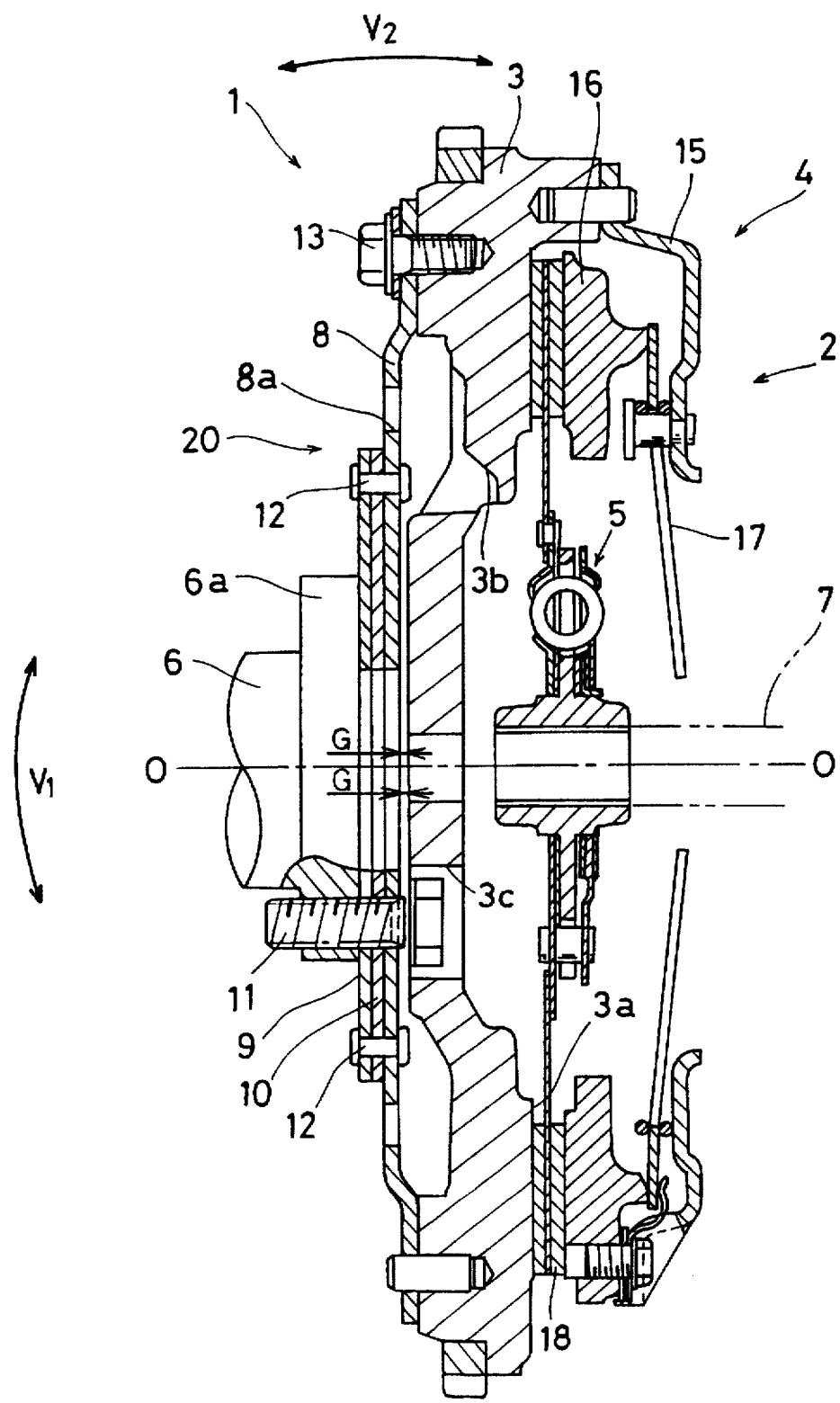
FIG. 1 is a side cross-sectional view of a flywheel assembly including a flexible plate assembly, and a clutch disk assembly according to one embodiment of the present invention.

FIG. 1 shows a flywheel assembly 1, and a clutch assembly 2 which is attached to the flywheel assembly 1. The flywheel assembly 1 is connected to a distal end of a crankshaft 6 of an engine (not shown) through a flange 6a, and includes a flexible plate assembly 20 and a flywheel 3.

The clutch assembly 2 includes a clutch cover assembly 4, and a clutch disc assembly 5 disposed partially inside of the clutch cover assembly 4. The clutch cover assembly 4 includes a clutch cover 15 connected to the outer circumference of the flywheel 3, a pressure plate 16 and a diaphragm spring 17. The diaphragm spring 17 urges the pressure plate 16 toward the friction facings of the clutch disc assembly 5 and a friction face 3a formed on the flywheel 3.

Torque from the engine (not shown) is transmitted to the flywheel 3 through the flexible plate assembly 20. The flexible plate assembly 20 is arcuate in shape and includes a first flexible plate 8, a second flexible plate 9 and a friction plate 10. The flexible plate assembly 20 is generally rigid in the circumferential direction, but is flexible in bending directions, where the bending directions are defined as the directions of elastic deformation of the flexible plate assembly 20 generally along the line 0—0 or about a point on the line 0—0 which generally coincides with the center of the flexible plate assembly 20.

The first flexible plate 8 has an outer circumference larger than the second flexible plate 9 and the friction plate 10. The friction plate 10 is disposed between the first flexible plate 8 and the second flexible plate 9, and a plurality of rivets 12 connect the friction plate 10 and the second flexible plate 9 to a mid-portion of the first flexible plate 8. The first flexible plate 8, the second flexible plate 9, and the friction plate 10 are connected to the flange 6a by means of a plurality of first bolts 11. The outer circumference of the first flexible plate 8 is connected to the flywheel 3 by means of a plurality of second bolts 13. The flexible plate 8 also includes a plurality of first holes 8a formed between the rivets 12 and the second bolts 13.

A plurality of second holes 3b are formed in the flywheel 3 and are equally spaced apart in the circumferential direction. A plurality of third holes 3c are also formed in the flywheel 3 in order to accommodate the heads of the first bolts 11. A predetermined gap G is formed between the inner circumferential portions of the flywheel 3 and the first flexible plate 8.

The operation of the present invention will now be described.

Figure 2:
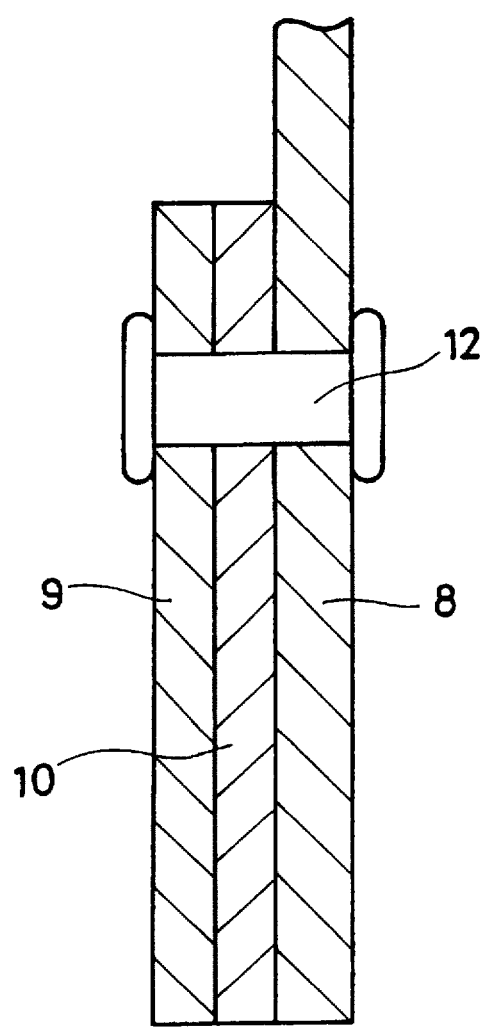
FIG. 2 is a fragmentary cross-sectional view of a portion of the flexible plate assembly depicted in FIG. 1.
Figure 3:
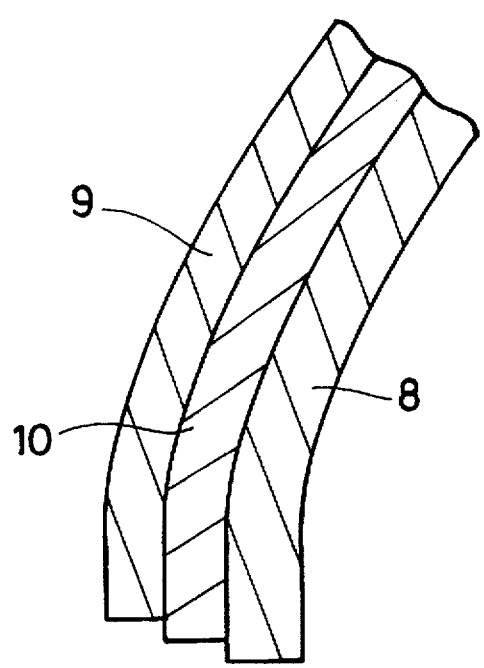
FIG. 3 is similar to FIG. 2, but shows the flexible plate assembly being elastically deformed by bending vibrations.

When torque is applied to the crankshaft 6, the crankshaft 6 is rotated in the direction $V_1$ about the center line 0—0, and the flexible plate assembly 20 is elastically deformed in the direction $V_2$, i.e. in the bending direction. As shown in FIGS. 2 and 3, when the flexible plate assembly 20 is flexed in the bending direction, friction is produced between the respective plates because the friction plate 10 abrades against the first flexible plate 8 and the second flexible plate 9. This friction dampens the bending vibrations and thereby reduces the amount of vibration and noise felt by the passengers in the vehicle. Furthermore, because the vibrations from the flywheel 3 are dampened, uneven wear on the friction facings 3a of the clutch disc assembly 5 is reduced.

In addition, the presence of the first holes 3b and the second holes 8a allow air to flow through the flywheel assembly 1 and the clutch assembly 2. The holes 3b and 8a allow heat generated during clutch operation to be effectively dissipated, thereby reducing the amount of degradation of the clutch disk assembly 5 due to high temperature.

The first flexible plate 8, the second flexible plate 9 and the friction plate 10, as stated above, are preferably made of a sheet metal material. However, it should be appreciated that other materials could be used to obtain desirable friction producing characteristics. For instance, on one or more of the first flexible plate 8, the second flexible plate 9 and the friction plate 10 could be surface hardened or provided with a rough or grooved surface to enhance the friction producing characteristics of the plates in engagement with one another. Further, the rigidity or tightness of the rivets 12 in an axial direction affects the friction producing characteristics of the first flexible plate 8, the second flexible plate 9 and the friction plate 10. It is desirable in most applications for the rivet 12 to provide firm axial retaining force for friction engagement between the first flexible plate 8, the second flexible plate 9 and the friction plate 10. However, in some applications it may be desirable for the rivet 12 to be less rigid axially. In this case, the rivet may be replaced by a lock-nut and bolt which may be tightened to a specific torque.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

We claim:

1. A flexible plate device for transferring torque from a crankshaft of an engine to a flywheel and absorbing bending vibration therebetween, comprising:

a first plate having an outer circumferential portion connect to a flywheel, and an inner portion connected to a crankshaft;

a second plate fixed to a mid-portion of said first plate between said outer circumferential portion and said inner portion of said first plate by a plurality of pins which extend through apertures in said first and second plates; and a friction plate disposed between said first and second plates, said friction plate being configured to produce friction between itself and said first and second plates in response to elastic deformation of said first plate in axial directions;

wherein said first plate, said second plate and said friction plate are fixed to one another by the pins extending through apertures formed therein, said first plate, said second plate and said friction plate being generally rigid in a circumferential direction and flexible in said axial directions about the end of the crankshaft.

2. The flexible plate device as set forth in claim 1, wherein inner circumferential portions of said flywheel are spaced apart from said inner portion of said first plate defining a predetermined gap in a torsion free state.

3. The flexible plate assembly according to claim 1, wherein said first plate, said second plate and said friction member are all formed from sheet metal.

* * * * *